(12) United States Patent
Perkins et al.

(10) Patent No.: US 8,788,884 B2
(45) Date of Patent: Jul. 22, 2014

(54) AUTOMATIC CORRECTION OF PROGRAM LOGIC

(75) Inventors: Jeff Herbert Perkins, Cambridge, MA (US); Stylianos Sidiroglou, Cambridge, MA (US); Martin Conway Rinard, Arlington, MA (US); Eric Patrick Lahtinen, Canton, MA (US); Paolo Mario Piselli, Arlington, MA (US); Basil C Krikeles, Wakefield, MA (US); Timothy Alan Anderson, Sudbury, MA (US); Greg Timothy Sullivan, Auburndale, MA (US)

(73) Assignees: Massachusetts Institute of Technology, Cambridge, MA (US); BAE Systems Information and Electronic Systems Integration Inc., Nashua, NH (US)

( * ) Notice: Subject to any disclaimer, the term of this patent is extended or adjusted under 35 U.S.C. 154(b) by 781 days.

(21) Appl. No.: 12/961,922

(22) Filed: Dec. 7, 2010

(65) Prior Publication Data
US 2012/0144227 A1    Jun. 7, 2012

(51) Int. Cl.
G06F 11/00    (2006.01)
(52) U.S. Cl.
USPC .......................................... 714/38.1; 726/22
(58) Field of Classification Search
None
See application file for complete search history.

(56) References Cited

U.S. PATENT DOCUMENTS

| | | | |
|---|---|---|---|
| 8,327,189 B1 * | 12/2012 | Glade et al. ................ | 714/26 |
| 2007/0016949 A1 | 1/2007 | Dunagan et al. | |
| 2007/0107057 A1 * | 5/2007 | Chander et al. ................ | 726/22 |
| 2007/0169192 A1 * | 7/2007 | Main et al. .................... | 726/22 |
| 2009/0077540 A1 * | 3/2009 | Zhou et al. .................... | 717/126 |
| 2009/0138937 A1 * | 5/2009 | Erlingsson et al. ............. | 726/1 |
| 2009/0183171 A1 * | 7/2009 | Isaacs et al. ................... | 719/311 |
| 2010/0293407 A1 * | 11/2010 | Locasto et al. ................. | 714/2 |

FOREIGN PATENT DOCUMENTS

WO    2008/055156    5/2008

OTHER PUBLICATIONS

Jeff H. Perkins, Sunghun Kim, Sam Larsen, Saman Amarasinghe, Jonathan Bachrach, Michael Carbin, Carlos Pacheco, Frank Sherwood, Stelios Sidiroglou, Greg Sullivan, Weng-Fai Wong, Yoav Zibin, Michael D. Ernst, and Martin Rinard. "Automatically patching errors in deployed software." *In Proceedings of the 21st ACM Symposium on Operating Systems Principles,* (Big Sky, MT, USA), Oct. 12-14, 2009, pp. 87-102.

(Continued)

*Primary Examiner* — Gabriel Chu
(74) *Attorney, Agent, or Firm* — Occhiuti & Rohlicek LLP

(57) ABSTRACT

An approach to detection and repair of application level semantic errors in deployed software includes inferring aspects of correct operation of a program. For instance, a suite of examples of operations that are known or assumed to be correct are used to infer correct operation. Further operation of the program can be compared to results found during correct operation and the logic of the program can be augmented to ensure that aspects of further examples of operation of the program are sufficiently similar to the examples in the correct suite. In some examples, the similarity is based on identifying invariants that are satisfied at certain points in the program execution, and augmenting (e.g., "patching") the logic includes adding tests to confirm that the invariants are satisfied in the new examples. In some examples, the logic invokes an automatic or semi-automatic error handling procedure if the test is not satisfied. Augmenting the logic in this way may prevent malicious parties from exploiting the semantic errors, and may prevent failures in execution of the programs that may have been avoided.

18 Claims, 6 Drawing Sheets

(56) References Cited

OTHER PUBLICATIONS

Ernst, M. D., Perkins, J. H., Guo, P. J., McCamant, S., Pacheco, C., Tschantz, M. S., and Xiao, C. "The Diakon system for dynamic detection of likely invariants." *Science of Computer Programming* 69, 1-3 (Dec. 2007).

"Web sites that can take a punch" by Larry Hardesty. MIT News: http://web.mit.edu/newsoffice/2010/web-attacks-0317.html, Mar. 17, 2010.

* cited by examiner

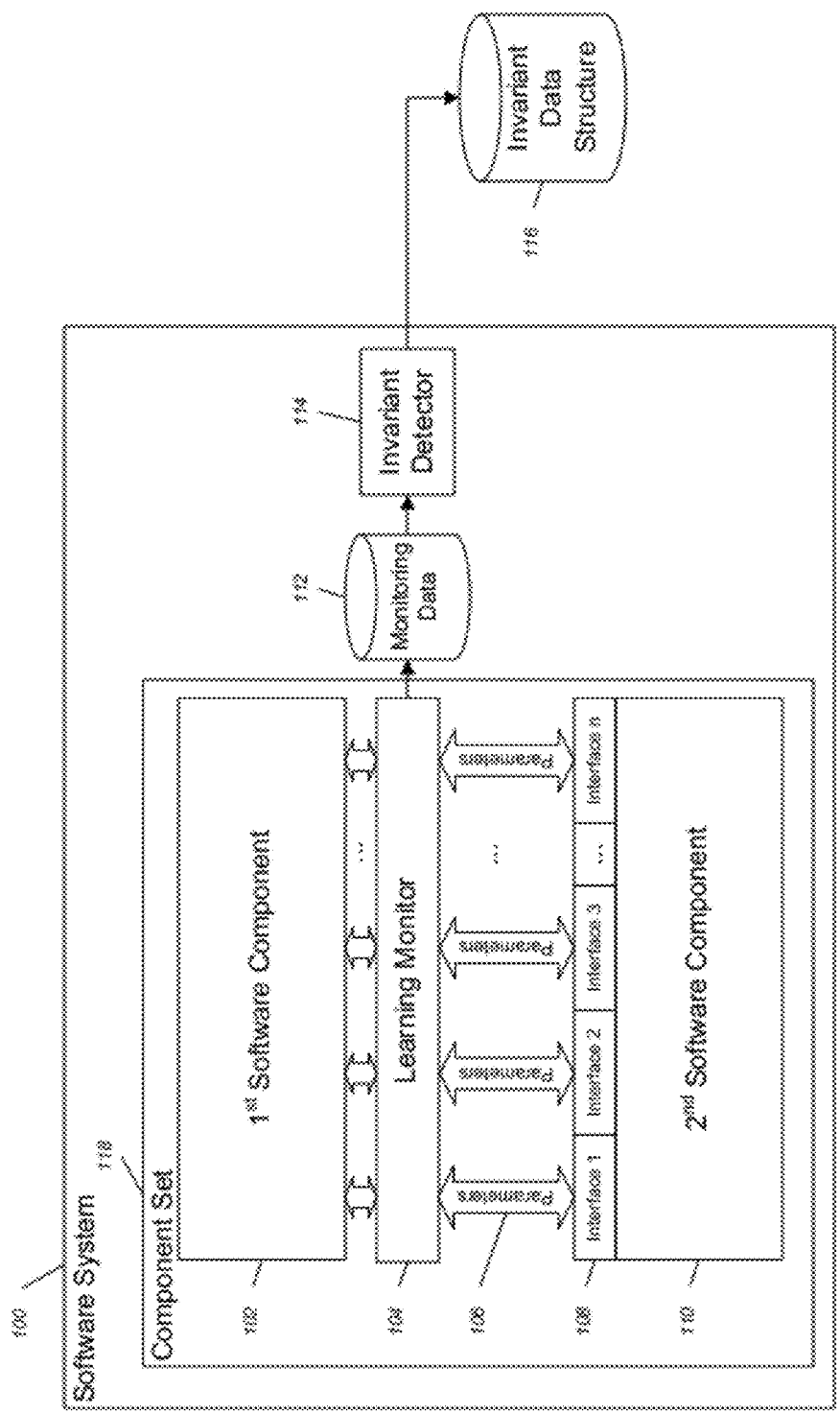
FIG. 1 – Learning Phase

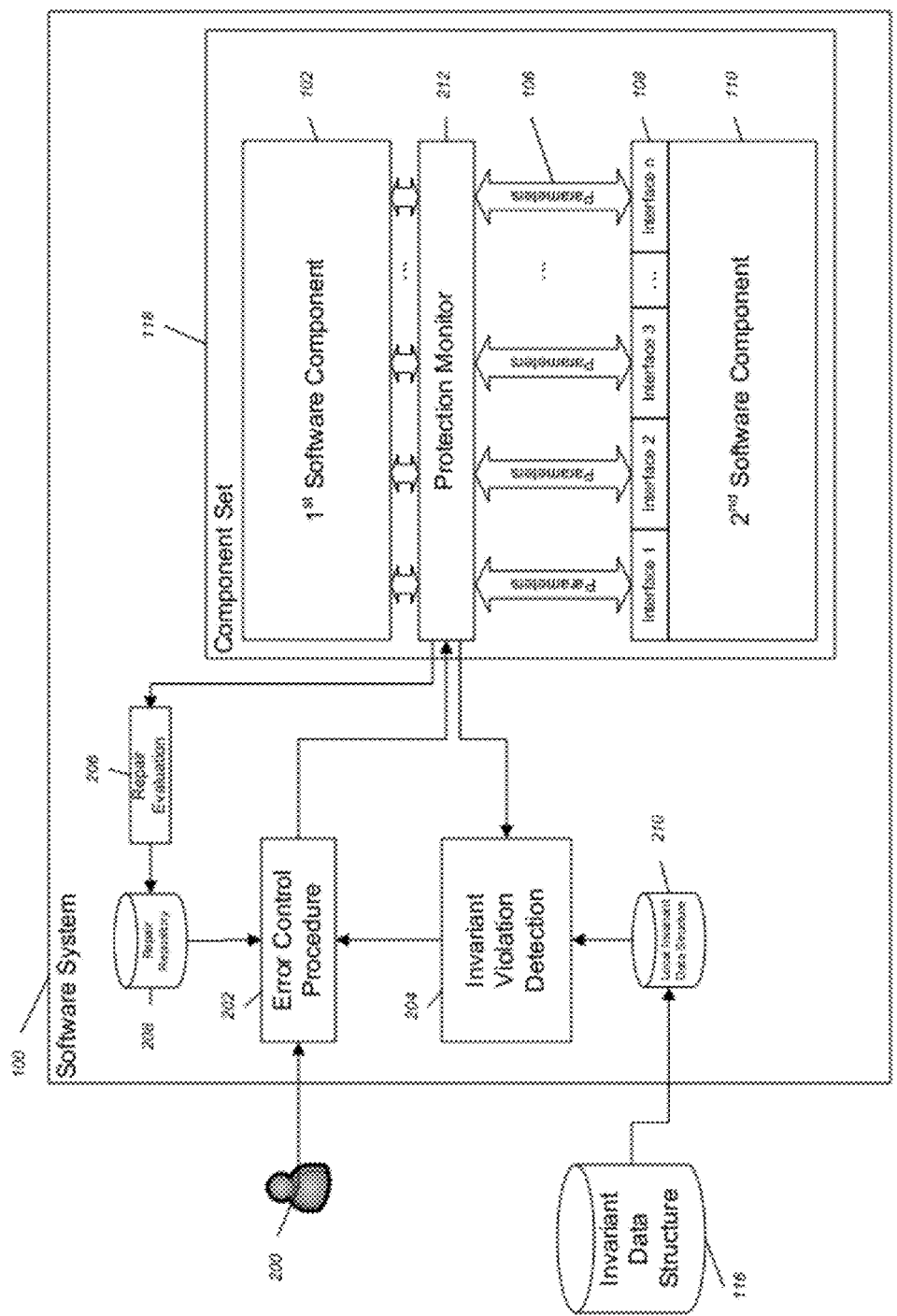
FIG. 2 – Protection Phase

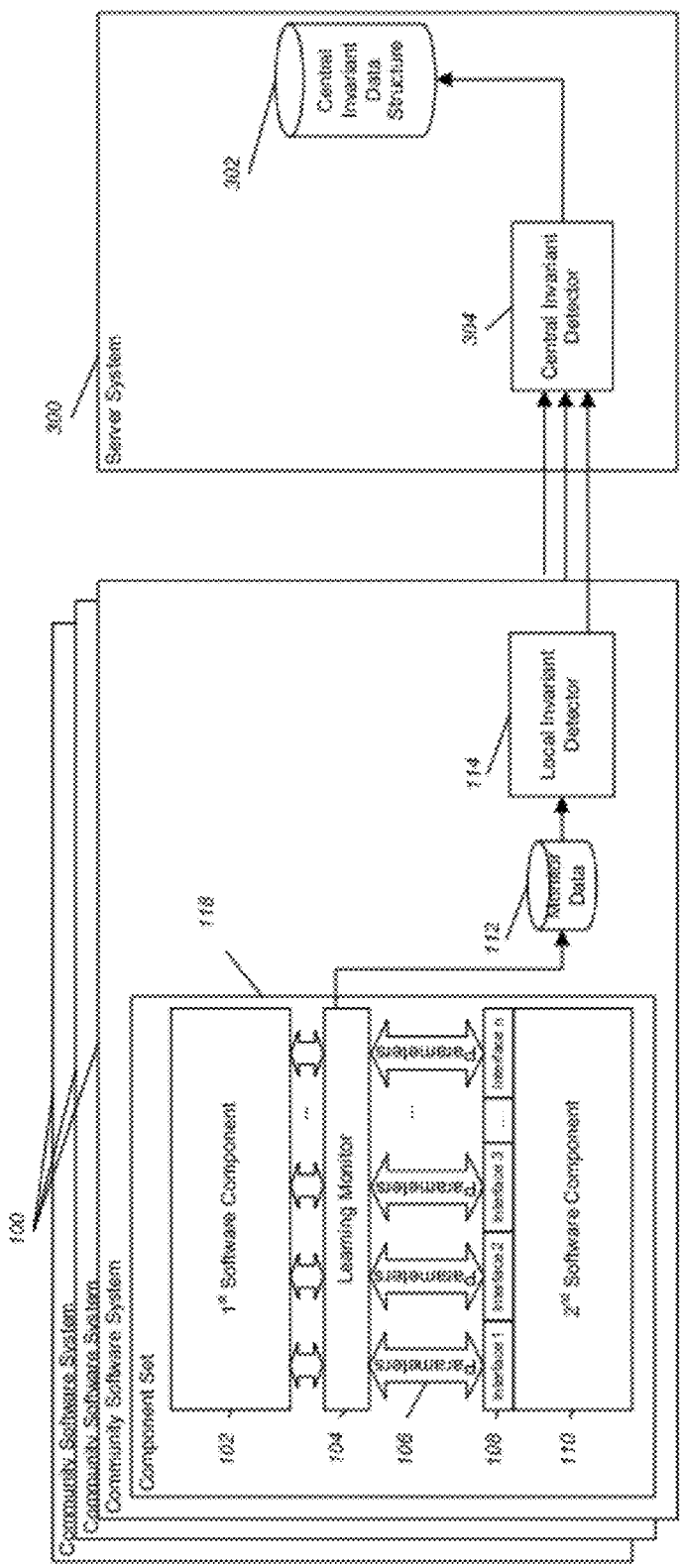
FIG. 3 – Community Learning Phase

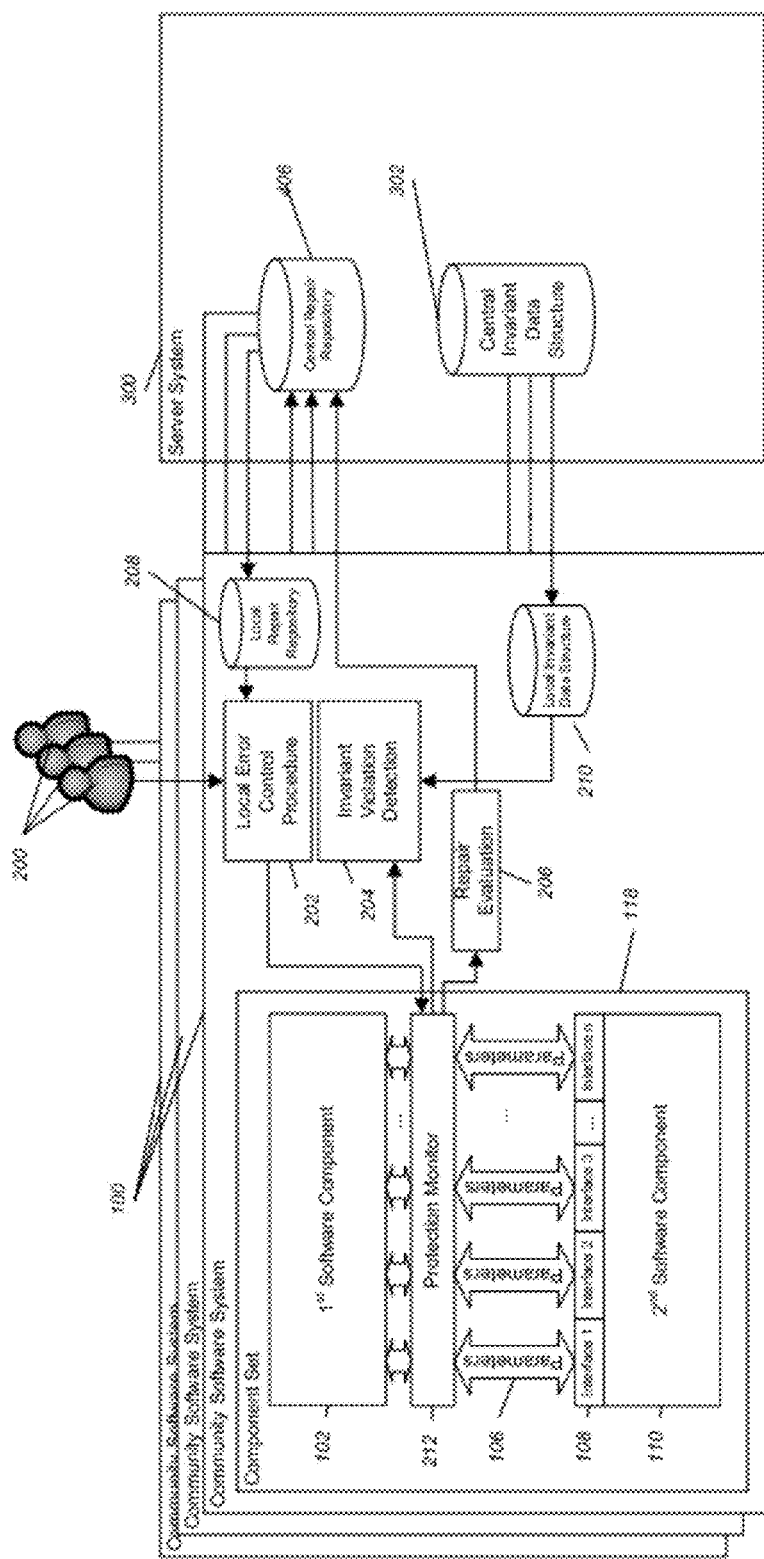
FIG. 4 – Community Protection Phase

```
01  int main() {
02      a(1); a(2);
03  }
04
05  void a (int n) {
06      if (n == 1) b();
07      else b();
08  }
09
10  void b() {
11      c();
12  }
13
14  void c() {
15      DeleteFileW ("/tmp/test");
16  }
```

PPT 1         PPT 2
main@2        main@2
a@06          a@07
b@11          b@11
c@15          c@15
DeleteFileW   DeleteFileW FIG. 5 – Example of Program Points

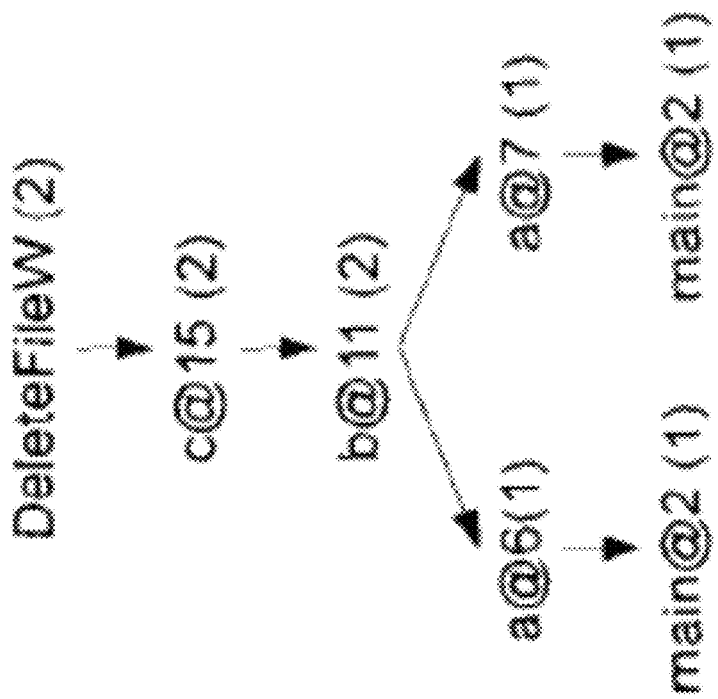
FIG. 6 – Example of a Call Chain Tree

AUTOMATIC CORRECTION OF PROGRAM LOGIC

STATEMENT AS TO FEDERALLY SPONSORED RESEARCH

The invention was made with government support under Grant No. FA8750-06-2-0189 awarded by the AFRL. The government has certain rights in the invention.

BACKGROUND

This specification relates to automatic correction of program logic.

Security continues to be a critical issue for applications. Despite enhancements to program robustness, the number of vulnerabilities due to errors in program logic in critical applications (such as browsers) continues to rise.

Errors in program logic, or "semantic errors," are distinct from structural errors in a program. Structural errors can result in violations of the program's basic structure. For example, overwriting a heap or stack buffer is a structural error. Various approaches have been proposed for automatically detecting such structural errors, for instance, without reference to the program's specification. Referencing the program's specification is not necessary to detect structural errors because such errors (e.g., writing off the end of a buffer) are not program specific. Attacks that take advantage of structural errors can also often be ameliorated by changes to the program (such as address randomization) that do not change the program's semantics. Attacks enabled by semantic errors cannot be eliminated by modifications that maintain program semantics.

Although a fair amount of work has been done on structural errors (e.g., program shepherding, address randomization, stack guards, etc), semantic errors, by contrast, have seen less attention. Such errors can be more difficult to address because information about the intended operation of the program is not generally explicitly available. A technical problem exists that programs with semantic errors have an implementation that does not match the intended program specification and may permit behavior that was not intended by the programmer. In some situations, such semantic errors may be exploited by malicious parties, for example, to gain access to a computer.

SUMMARY

In one general aspect, an approach to detection and repair of application level semantic errors in deployed software includes inferring aspects of correct operation of a program. For instance, a suite of examples of operations that are known or assumed to be correct are used to infer correct operation. Further operation of the program can be compared to results found during correct operation and the logic of the program can be augmented to ensure that aspects of further examples of operation of the program are sufficiently similar to the examples in the correct suite. In some examples, the similarity is based on identifying invariants that are satisfied at certain points in the program execution, and augmenting (e.g., "patching") the logic includes adding tests to confirm that the invariants are satisfied in the new examples. In some examples, the logic invokes an automatic or semi-automatic error handling procedure if the test is not satisfied. Augmenting the logic in this way may prevent malicious parties from exploiting the semantic errors, and may prevent failures in execution of the programs that may have been avoided.

In another aspect, in general, a computer implemented method is directed to automatically patching errors in a software system that a first software component and a second software component that has a set of interfaces. The method includes monitoring a first set of executions of the software system. The monitoring includes monitoring a plurality of interactions between the first software component and the set of interfaces of the second software component and identifying invariants from the plurality of interactions. A data structure is formed, which includes an association of each interface in the set of interfaces with invariants associated with that interface.

Aspects can include one or more of the following.

The method further includes monitoring a second set of executions of the software system. This monitoring includes accepting the formed data structure. For each interaction of a plurality of interactions between the first software component and the set of interfaces of the second software component in a second set of executions, the data structure is used to detect if either a context associated with an interface or an invariant of the invariants associated with the interface is violated. If violated, an error control procedure is initiated. The error control procedure includes performing a known behavior in response to the interaction.

Performing the known behavior includes providing a predetermined value to the first software component.

Performing the known behavior includes performing a confirmation routine to confirm that the interaction with the second software component should be performed. In some examples, performing the confirmation routine includes requesting a confirmation from a user of the first software component.

Identifying the invariants includes identifying invariants of the parameter values of interactions.

Identifying the invariants includes identifying invariants associated with a plurality of contexts of the interactions.

The formed data structure includes an association of each interface and a context of an interaction with said interface with the invariants associated with said interface and context.

The context of an interaction comprises a procedure call sequence.

The data structure represents, for each interface, a tree structure for a set of call sequences leading to the interaction with the interface, each leaf of the tree corresponding to a different context.

Invariants associated with an interface characterize constraints satisfied by parameters used in the interactions with said interface.

The constraints include at least constraint chosen from the set of: equality of a parameter value with a constant; equality of two parameter values; and membership of a parameter value in a set of values.

The constraints include a constraint satisfied by a function of a parameter value.

The function of the parameter value includes at least one of an extension, directory, and directory path of a parameter value representing a pathname in a file structure.

The first software component comprises a program component and the second software component comprises an operating system component, and the set of interfaces comprise interfaces to services provided by the operating system.

The first software component comprises a program component and the second software component comprises a software library component, and the set of interfaces comprise interfaces to library routines provided by the library component.

The first software component and the second software component comprise software components of a distributed system, and the interactions between the components comprise messages passed between the components.

In another aspect, in general, a computer implemented method is directed to automatically patching errors in a software system. The method includes accepting a data structure including an association of each interface in the set of interfaces with invariants associated with that interface. For each interaction of a plurality of interactions between the first software component and the set of interfaces of the second software component, the data structure is used to detect if either a context associated with an interface or an invariant of the invariants associated with the interface is violated. If violated, an error control procedure is initiated. The error control procedure includes performing a known behavior in response to the interaction.

In another aspect, in general, a computer implemented method is directed to automatically patching errors in a plurality of software systems. A first set of executions of each of the software systems is monitored. The monitoring includes monitoring a plurality of interactions between the first software component and the set of interfaces of the second software component and identifying invariants from the plurality of interactions. A data structure is formed, which includes an association of each interface in the set of interfaces with invariants associated with that interface. The data structures formed by each of the software systems are merged into a central data structure. In some examples, a second set of executions of each of the plurality of software systems are then monitored using the merged data structure.

In another aspect, in general, software stored on a computer readable medium comprises instructions, which when executed on a computer processor perform the steps of any one of the computer implemented methods specified above.

In another aspect, in general, a computer system is configured such that when operated, the system performs the steps of any one of the methods specified above.

Embodiments may have one or more of the following advantages.

One or more embodiments of the method described above can correct previously unknown errors in commercial-off-the-shelf (COTS) software systems. It repairs running applications without requiring restarts or otherwise perturbing the execution. It requires no human interaction or intervention, though human interaction may be utilized. It works on stripped binaries (for example, Windows x86 binaries) without access to source code or debugging information.

Other features and advantages of the invention are apparent from the following description, and from the claims.

DESCRIPTION OF DRAWINGS

FIG. 1 is a block diagram of a software system configured to learn invariants.

FIG. 2 is a block diagram of a software system configured to protect against invariant violations.

FIG. 3 is a block diagram of a community of software systems in combination with a server configured to learn invariants.

FIG. 4 is a block diagram of a community of software systems in combination with a server configured to protect against invariant violations.

FIG. 5 is a portion of C language program code.

FIG. 6 is a call chain tree of the portion of C code in FIG. 5.

DESCRIPTION

1 System Overview

Referring to FIG. 1, a software system 100 includes a number of executing component sets 118. A representative component set 118 includes at least two software components 102, 110, which interact via a set of interfaces 108. In one specific example, the first software component 102 is a browser application (e.g., Firefox), which interacts with the operating system (e.g., Microsoft Windows) as the second component 110. It should be understood that the approached described below are more generally applicable, for instance, to any multiple component software system in which components accesses services or procedures in other components through well-defined interfaces 108.

Generally, the approach involves two phases: a learning phase and an execution phase. During the learning phase, correct (or assumed correct) execution of the application is monitored. Certain points in the execution are specifically monitored, and characteristics of the program state at those points are distilled to form logical tests or other procedures that are to be performed at those points in the execution in future unknown situations. These logical tests and procedures serve to augment the program logic, for instance, to prevent malicious parties from exploiting the semantic errors, and may prevent failures in execution of the programs that may have been avoided. In addition, the program logic may be further augmented to include error mitigation procedures that are executed when a logic error is detected.

In the example of a web browser program, an example of desirable program logic may include a requirement that the browser should only allow files specified by the user to be uploaded to an external site. A coding error that allowed the external site to specify and upload arbitrary files is a semantic error. Approaches described in this document address a way of augmenting the program logic to achieve the desired logic without having to modify the original program.

In some examples, the points of a program that are monitored during program execution are function or subroutine calls. Each instance of a function call in the program code, differentiated from other instances by a context of the function call, is considered to be a unique program point.

An example of the interface call context is the call chain that led up to the interface being called. For instance, calling a function named CreateFileW from two functions named foo and bar would yield two separate call chains and thus two unique program points. At runtime, there may be multiple invocations of a function call in one or more contexts.

One example of a set of functions that could be monitored during program execution is a set of system calls such as CreateFileW, DeleteFileW, and ShellExecA.

2 Learning Phase

Referring to FIG. 1, the learning phase is a configuration of the software system 100 that is used to learn the normal operating envelope of the first software component 102. The learning phase is generally used in a situation where all of the input to the first software component 102 is assumed to be safe in the sense that it will not cause malicious or erroneous behavior. Note that in some alternatives, it is also possible to learn safe behavior in environments that are not known to be safe.

The learning phase configuration of the software system 100 includes a component set 118. The component set 118 includes the first software component 102 and the second software component 110 which interact through a set of interfaces 108.

The software system 100 augments the component set 118 with a learning monitor 104 disposed between the set of interfaces 108 and the first software component 102 without requiring any modification to either of the software components 102, 110. The learning monitor 104 intercepts calls to the set of monitored interfaces 108 and creates trace data containing the dynamic call chain, interface calls, and interface call parameters 106 for each call. For example, the learning monitor is implemented using existing dynamic program analysis tools such as PIN or DynamoRIO. The learning monitor 104 outputs the trace data, which is logged to a monitoring data structure 112.

Examples of calls that could be monitored are the Microsoft Windows system calls CreateFileW (open), DeleteFileW (delete), and ShellExecuteA (exec). Additional interface calls can also be monitored. In some implementations, it is also possible to include application specific calls if it is desirable to apply the system to the internals of the first software component 102 (and not just its interface 108 with the second software component 110).

An invariant detection module 114 analyzes the data stored in the monitoring data structure 112 for the purpose of identifying properties that always hold true at certain points in the first software component 102. These learned properties are called invariants. Invariants and invariant detection is discussed further in later sections. Once identified, the invariants are stored in the invariant data structure 116 for later use.

The data structure 116 can have various alternative structures. For example, the structure can include tables or a database that associates program points with invariants. Such data can be used to effectively impart the augmented functional program logic at runtime. Alternatively, the data structure 116 includes explicit instructions that are executed or interpreted at runtime.

In some embodiments, the software system 100 includes features that address a number of challenges that arise during the learning phase when learning invariants and program points. For instance, certain programming optimizations such as lazy initialization can make learning a complete envelope of operation difficult. Additionally, the system avoids learning malicious or erroneous behaviors.

2.1 Learned Properties

The invariants detected by the invariant detection module 114 during the learning phase depend on the set of invariant properties used, the parameters 106 over which the properties are checked, and the program points at which the properties are checked. The invariant detection module 114 checks each invariant in the grammar over each possible combination of parameters 106 at each program point.

2.1.1 Program Points

A program point includes an interface call and a context (e.g., the call chain, global variables, parameters to other calls, etc.) associated with the interface call. The software system 100 utilizes context sensitive program points to learn very precise invariants, allowing it to consistently identify invariant violations while suffering very few false positives.

Within the first software component 102, each context of an interface call in the code to one of the interfaces 106 is considered to be a unique program point. The invariants learned at a call to CreateFileW in routine foo, for example, are considered distinct from those learned from a call in routine bar. Furthermore, invariant detection is context sensitive to the entire dynamic call chain. The precise location of each call (e.g., determined by its offset in its DLL) is used to identify the interface call each program point For example, referring to FIG. 5, a portion of C code is presented that results in two distinct program points (labeled PPT 1 and PPT 2). Each program point is identified by the list of active calls. Even though the same routines are called in each case, there are two different program points because routine b is called from two different call sites.

Duplicate entries in the dynamic call chain may be removed. This ensures that two call chains that only differ by recursion depth will be treated as the same program point.

2.1.2 Parameters

Each of the parameters 106 used in a call to an interface 108 can be used for invariant detection. For example, the interface 108 CreateFileW accepts five parameters 106 (pathname, access, sharing, creation, and attributes). The invariant detection module 114 could use all five of the parameters 106 or a configurable subset of the five parameters 106 to detect invariants.

The software system 100 may also create one or more additional parameters 106 (derived parameters) for each original parameter 106. For example, string parameters that represent pathnames may be used to derive additional parameters 106 (e.g. file extensions, the root directory, etc.). Derived parameters are used for invariant detection in the same manner as are the original parameters 106.

2.1.3 Call Chain Tree

The call chains learned during the learning phase are combined into trees of call chains for later comparison at runtime. Effectively, the tree provides an efficient data structure that allows matching call mains to data structures associated with those contexts, or for identifying suffix matches between new call chains and chains observed during the learning phase.

A call chain tree is built by combining all of the call chains related to a particular interface call. Each node in the tree is a routine from the call chain. The root of the tree is the interface call. The leaves of the tree are the original function calls that began the call chain that eventually called the interface 108. In between the root and the leaves of the tree, the call chain routines are shown in the order that they were called. For example, the combined tree for the call chains identified in FIG. 5 is shown in FIG. 6.

In some examples, each tree contains all of the call chains that were learned for a particular interface call and for each leaf of the tree, a subset of the parameters 106 observed to have been passed to the interface call. For example, the parameters 106 for the interface 108 CreateFileW are the extension, attributes, and access. The only parameter 106 used for the interfaces 108 DeleteFileW and ShellExecA is the extension of the file name. For example, all of the stacks learned for CreateFileW may have extension .jar.

2.1.4 Set of Invariant Properties

The invariant detection module 114 uses a set of invariant properties to identify invariants. Examples of such properties of a parameter 106 value x, or a pair of parameter 106 values x, y include being constant ($x=a$), non-zero ($x \neq 0$), being in a range ($a \leq x \leq b$), linear relationships ($y=ax+b$), ordering ($x \leq y$), functions from a library ($x=fn(y)$), containment ($x \in y$), sortedness (x is sorted), and many more. The set of invariant properties of the invariant detection module 114 may be extended to check for additional invariants.

In one exemplary embodiment, the invariant detection module 114 relies on a few simple tests for identification of invariants:

a. Equality—Two parameters 106 are equal to one another ($x=y$).

b. One of—A parameter 106 is always one of a small list of constant values. For example, filename is always one of /etc/startup or /.startup. Or extension is always one of a set of image extensions (e.g., jpg, gif, etc).

c. Constant—A parameter 106 always has the same constant value. For example filename equals C:/Windows/system32/shell32.dll.

2.1.5 Learning Configuration

In some examples, the learning phase is configured to identify the interface calls to me monitored. In some examples, for each of the calls to be monitored, the particular parameters to be monitored and any derived parameters are also identified. In some examples, either globally or specifically for particular interface calls, the invariant properties to be considered are also configured. As a further configuration example, in some examples, certain routines are identified to be ignored in the call chains, and certain patterns, such as repeated function calls, which may be associated with recursion, are marked to be collapsed into a single node in the call trees.

2.1.6 Learning Variants

If the learning phase included trace data from malicious or erroneous behaviors, then those behaviors would be considered normal and would not be detected during the protection phase. There are several ways in which a software system 100 or community of software systems 100 can protect itself from the impact of such behaviors.

First, trace data can be quarantined until any error would have been detected by other means. Any suspect data is not used to create invariants.

Second, learning runs are limited to inputs that are known to be safe and error free. For the example of a browser, this would mean limiting the web pages that are loaded to those on sites considered to be safe.

Complex user interface applications such as Firefox do not behave consistently from run to run even when performing the same actions. This is true even during non user interface activities such as during startup. There are a variety of reasons for this:

First, user interface code is often event driven. Events can be processed immediately or can be placed on a queue if the application is not able to process them. The processing of events varies based on timing and other factors. Even small timing deviations can lead to surprising changes in both what system calls are made and the dynamic call chains of those calls.

A second reason relates to lazy initialization. In order to speed up response, user interface applications only initialize when necessary. Checks to see what initialization is necessary are scattered throughout the code. Again, timing may change where/when the initialization takes place.

A third reason relates to environment checks. A configurable user interface application may check its environment for configuration changes each time any task that can be configured is performed. These checks are often unrelated to the action being performed.

The combination of these and other factors leads to an explosion in behaviors from run to run (if the entire dynamic call chain is considered). Even after hundreds of identical scripted runs, new call chains will be seen.

Inconsistent application execution as is described above makes it difficult to learn a complete operating envelope of the first software component 102 because of the multiple call chains possible for a particular invariant. For this reason, inconsistent application execution is addressed at the protection phase by limiting the depth and branching of the call chain tree considered by the invariant violation detector 204.

3 Protection Phase

Referring to FIG. 2, the protection phase makes use of a configuration of the software system 100 that uses the logical tests and procedures determined in the learning phase to prevent malicious and erroneous behaviors from occurring. The protection phase is used in situations where the input to the system is unknown and it is not known whether the input will cause malicious or erroneous behavior.

The protection phase configuration of the software system 100 accepts as input the invariant data structure 116. A local copy of the invariant data structure 210 is included in the software system 100.

The protection phase configuration of the software system 100 further includes a component set 118. The component set 118 includes the first software component 102 and the second software component 110 which interact through a set of interfaces 108, as in the configuration during the learning phase.

In a manner similar to that in the learning phase, the software system 100 augments the component set 118 with a protection monitor 212. The protection monitor 212 is disposed between the set of interfaces 108 and the first software component 102 without requiring any modification to either of the software components 102, 110. As in the learning monitor 104, the protection monitor 212 intercepts calls to the set of interfaces 108 and creates trace data containing the dynamic call chain, interface calls, and interface call parameters 106 for each call to a monitored interface call.

3.1 Violation Detection

An invariant violation detection module 204 accepts trace data from the protection monitor 212 and invariant data from the local copy of the invariant data structure 210. The invariant violation detection module 204 processes the trace data according to the data and/or instructions in the invariant data structure 210. If the trace data does not correspond to any of the known safe program points in the local copy of the invariant data structure 210, the call chain is compared to the call chain tree to determine if the call chain represents a violation. If the trace data corresponds to a known safe program point in the local copy of the invariant data structure 210, the invariant associated with the program point is checked. If the invariant does not correspond to a known safe invariant, an invariant violation has occurred and the intended specification of the first software component 102 may be violated. Upon detection of a violation, the invariant violation detection module 204 triggers an error control procedure 202.

The protection monitor 212 extracts the dynamic call chain and parameters 106 of each monitored interface 108 at runtime. As was previously described, a program point is defined by an interface 108 and its call chain. The software system 100 uses the call chain to look up the invariants for this program point.

If a call chain is found in the call tree, and therefore the call chain was previously seen during the learning phase, the parameters of the interface calls are checked according to the learned invariant data. If any invariant is violated (for example extension .exe is not one of .gif, .jpg, or .png), an erroneous or malicious behavior has been identified.

If on the other hand the call chain is new (i.e., it was not seen during learning), the behavior is considered to be suspect. The call chain is compared to the learned call chains to determine where it differs. The type and degree of the difference determines whether or not the call chain is considered to be an erroneous or malicious behavior.

When the invariant violation detection module 204 encounters a previously unseen call chain, the call chain is compared against a call chain tree that matches its interface call and parameters 106. The call chain is matched routine by routine starting at the interface call until there is a mismatch. For example, if the call chain (DeleteFileW, c@15, b@11, d@23, main@2) were compared against the call chain tree in FIG. 6, it would match 3 levels deep. This is defined as the depth. At the point where the mismatch occurred, there were 2 branches (a@6 and a@7). This is defined as the branching.

When a call chain mismatch occurs, the depth and branching for a call chain comparison are used to determine whether the call chain is considered to be a normal behavior or an erroneous or malicious behavior. In general, the depth and branching are configurable and may vary between different programs. The software system 100 implements two different checks depending on the interface call and its parameters 106. The software system 100 may consider some directories to be safe to read from. These are directories that are known not to contain files with sensitive information. For example, these directories can be part of the standard Windows distribution or part of the standard distribution of the first software component 102. In this example, the default configuration of the software system could treat the Windows system32 directory (normally C:/Windows/system32), the Java installation directory (normally C:/Program Files/Java), and the first software component 102 directory (in this case C:/Program Files/Firefox) as safe.

For reads from safe directories, the software system 100 may consider any previously unseen call chain with a depth of greater than 5 or a branching of greater than 3 to be normal operation. For any other operation, the software system 100 may require a depth greater than 15 or branching greater than 5 to consider the operation normal. Any operation that is not considered normal is treated as a malicious or erroneous behavior and blocked.

A relatively large depth (e.g., 15) implies an operation that has been seen before albeit in a somewhat different context. A relatively large branching value indicates that this is a routine that is known to be called from a number of different places. This is what occurs when similar checks (such as lazy initialization) are placed throughout the code. A new source for this common interface call is unlikely to be a malicious or erroneous behavior.

3.2 Repairing Errors

When the invariant detection module 204 identifies a malicious or erroneous behavior it initiates the error control procedure 202. The error control procedure 202 automatically or semi-automatically generates possible repairs to mitigate or prevent erroneous or malicious behaviors. Repairs are effectively augmentations of the program logic that are applied by the protection monitor 212 by modifying the calls to the set of interfaces 108. Semi-automatic generation of the repairs may involve input from a user 200. For example, the error control procedure 202 may ask the user 200 whether or not an operation is deemed to be safe and then react according to the user's decision.

After the error control procedure 202 generates a repair, the repair is sent to the protection monitor 212. The protection monitor 212 applies the repair by modifying the malicious or erroneous interface call before it is sent to the second software component 110. In this way, malicious or erroneous behaviors can be intercepted and repaired by augmenting the program logic before they violate the specification of the first software component 102.

In some embodiments, after the protection monitor 212 applies the repair, a repair evaluation module 206 monitors the effect of the repair on the first software component 102. Repair strategies are built-in for each interface call and type of violation (invariant or unknown call chain). The repair evaluation module 206 maintains a score for each possible repair and the error control procedure 202 uses the highest scored repair each time it detects a malicious or erroneous behavior. If the repair has a positive effect on the first software component 102, such as the software continuing to run, the repair evaluation module 206 upgrades the repair. If the repair has a negative effect on the first software component 102, such as terminating the program or initiating an infinite loop, the repair evaluation module 206 downgrades the repair. This scoring system facilitates the error control procedure 202 choosing the most effective repair for the situation. This information can be used in selecting repairs for future malicious or erroneous behaviors.

3.2.1 Types of Repairs

Implementations of the error control procedure 202 support one or more of several categories of repairs. Some examples such as returning an error, enforcing invariants, shadow implementations, and termination of execution are described below.

3.2.1.1 Returning an Error

One strategy is to not perform the violating interface call and return an error. Since the call is not performed, the malicious or erroneous behavior cannot succeed. For example, if the first software component 102 is attempting to open a file using CreateFileW, the interface call will be skipped and an 'Access Denied' error code can be returned. Since most applications handle error codes, the existing code in the application is utilized to handle the problem.

The software system 100 can support different versions of this repair method with different error codes. In cases where the first software component has different codes for various errors, this allows the software system 100 to find the repair that works best.

3.2.1.2 Enforce Invariants

When a particular invariant is violated, another possible repair is to enforce the invariant. For example, consider the invariant that a file's extension should be one of .jpg, .gif, or .png. If a .exe file is found instead, the extension can be changed to one of the valid extensions.

3.2.1.3 Shadow Implementation

A shadow implementation makes it appear to the first software component 102 that the interface call was performed, but doesn't actually perform the call. For example, a delete could return success and future checks for that file would indicate that it didn't exist. Similarly, a file open could return success and direct all future read/writes to /dev/null.

3.2.1.4 Terminate Execution

Another possible result is to systematically terminate execution of the first software component 102. This action would only be chosen if none of the other repairs seemed to work consistently.

3.2.2 Repair Evaluation

After the repair has been applied, further progress of the first software component 102 can be monitored by the error control procedure 202. If the first software component 102 is not progressing normally, the score of the repair is downgraded. There are number of ways in which the first software component 102 can be monitored.

a. The first software component 102 can be checked to see if it terminates abnormally (i.e., crashes).
    b. The first software component 102 can be checked to see if is still responsive to inputs.
    c. The first software component 102 can be checked to see if it has entered an extended (possibly infinite) loop. This can done using the same monitoring that is used for interface calls. If a particular call and/or repair is repeated extensively, the first software component 102 is presumed to be progressing abnormally.

d. The user can report that there is a problem in the first software component 102.

4 Community Learning Phase

Referring to FIG. 3, the community learning phase utilizes a large set of software systems 100 to compile a centralized set of invariants on a central server system 300. By utilizing data from the set of software systems 100, the centralized set of invariants can be very precise relative to the set of invariants produced by a single software system 100.

The community learning phase supports gathering data from a community of software systems 100 running the first software component 102. The community includes a set of the software systems 100 that were presented in FIG. 1.

Each of the software systems 100 in the community is configured and operates in much the same way as the learning phase presented in Section 2, monitoring execution and producing a set of invariants.

In the community learning phase, the invariant detection module 114 runs locally on each of the software systems 100. The local invariant detection modules 114 can run continuously and can send results to the centralized server system 300 at any point. This allows the load on the network of communicating the learned data to be arbitrarily reduced since the output file size does not vary significantly with the size of the input file.

A central invariant detector 304 is included in the centralized server system 300. The central invariant detector 304 accepts the sets of invariants from each software system 100 and merges them to produce a central set of invariants that are true across all software systems 100 in the community. The central set of invariants is then stored in the central invariant data structure 302 for later use. This central set of invariants has the advantage of being a compilation of all of the sets of invariants from the community.

5 Community Protection Phase

Referring to FIG. 4, a community protection phase utilizes the set of invariants created during the community learning phase to detect and repair malicious or erroneous behaviors in the first software component 102. The centralized server system 300 monitors the effectiveness of repairs and updates the community software systems with data indicating which repair should be used. By centralizing the ranking of repairs, the individual software systems 100 of the community can benefit from the experiences of the other community software systems, thereby making the repair process more effective.

A community includes a large set of software systems 100, each configured similarly to the protection phase software system 100 of FIG. 2. Each software system 100 includes a local repair repository 208 that is used by the local error control procedure 202 to select appropriate repairs.

The community protection phase also includes a centralized server system 300. The centralized server system 300 includes a central repair repository 406 and a central invariant data structure 302. The centralized server system 300 is configured to collect repair evaluation information from the set of software systems 100. The collected information is then merged to create and maintain a set of repairs in a central repair repository 406. The repairs in the central repair repository 406 are true across all of the set of software systems 100 in the community.

When the protection phase begins, the central invariant data structure 302 is loaded into the local copy of the invariant data structure 210.

During execution, the community software systems 100 function in much the same way as the software systems 100 of FIG. 2. The main difference is that the repair evaluation module 206 sends repair evaluation information to the central repair repository 406 on the centralized server system 300.

The central repair repository 406 maintains the set of repairs that are true across all of the software systems in the set of software systems 100. The centralized server system 300 updates the local repair repository 208 when the repair rankings change.

When a malicious or erroneous behavior is detected, the local error control procedure 202 uses the repair information stored in the local repair repository 208 to determine which repair to utilize.

6 Applications

The method described in this application can be applied in a variety of applications where robustness of software is critical and access to source code and debugging information is limited or unavailable.

The method can be applied to any commercial-off-the-shelf (COTS) software systems.

7 Alternatives

In some embodiments, the approaches described above are directed to interface calls between an application program and an operating system (such as Microsoft Windows). However, the method could be applied to any interface between two software components, for example between an application program and an application library (e.g., a dynamic linked library in Microsoft Windows).

The approach described is not limited to interfaces between software components on one computer. For example, the approach is applicable to servers that have interfaces 108 to particular services or remote procedure calls. In such cases, the monitoring and protection may be performed at the client side or at the server side. In some such distributed implementations, the context of an interface call may include features such as an interface call history (e.g., a history of prior calls from the client to that server, such as a history of URLs in a web environment).

The embodiment presented utilizes a set of invariant properties such as simple comparisons to create invariants. However, the set of invariant properties can involve more complex functions (e.g., comparing several parameters to each other or using the parameters in conditional statements).

The two phases of learning and protection are described in the application as running serially. However, the two phases can be combined to run concurrently. In this way, the method can continually learn and protect. One way to accomplish this is to quarantine learned invariants until it is known that they did not cause malicious or erroneous behavior. Once the quarantined invariants are known to be safe, they can be added to the set of safe invariants.

The data structure can have various alternative structures. For example, the structure can include tables or a database that associates program points with invariants. Such data can be used to effectively impart the augmented functional program logic at runtime. Alternatively, the data structure includes explicit instructions that are executed or interpreted at runtime.

8 Implementations

Examples of the approaches described above may be implemented in software, in hardware, or in a combination of hardware and software. The software may include a computer readable medium (e.g., disk or solid state memory) that holds instructions for causing a computer processor (e.g., a general purpose processor, etc.) to perform the steps described above.

The method described may be implemented on a single computer or it may be implemented on a large set of computers that are networked together in a community setting.

It is to be understood that the foregoing description is intended to illustrate and not to limit the scope of the invention, which is defined by the scope of the appended claims. Other embodiments are within the scope of the following claims.

What is claimed is:

1. A computer implemented method for automatically patching errors in a software system that includes a first software component and a second software component including a set of interfaces, the method comprising:
    monitoring a first set of executions of the software system including:
        monitoring a plurality of error-free interactions between the first software component and the set of interfaces of the second software component;
        identifying invariants from the plurality of error-free interactions, each invariant being associated with one or more contexts;
        forming a data structure including an association of each interface in the set of interfaces with invariants associated with that interface; and
    monitoring a second set of executions of the software system including:
        accepting the formed data structure;
        for each interaction of a plurality of interactions between the first software component and the set of interfaces of the second software component in a second set of executions:
            using the data structure to determine whether the interaction between the first software component and an interface of the set of interfaces violates any invariants associated with the interface and their associated contexts; and
            initiating an error control procedure including performing a known behavior in response to the interaction if it is determined that the interaction violates any invariants associated with the interface and their associated contexts.

2. The computer implemented method of claim 1 wherein performing the known behavior includes providing a predetermined value to the first software component.

3. The computer implemented method of claim 1 wherein performing the known behavior includes performing a confirmation routine to confirm that the interaction with the second software component should be performed.

4. The computer implemented method of claim 3 wherein performing the confirmation routine includes requesting a confirmation from a user of the first software component.

5. The computer implemented method of claim 1 wherein identifying the invariants includes identifying invariants of parameter values of interactions.

6. The computer implemented method of claim 1 wherein identifying the invariants includes identifying invariants associated with a plurality of contexts of the interactions.

7. The computer implemented method of claim 6 wherein the formed data structure includes an association of each interface and a context of an interaction with said interface with the invariants associated with said interface and context.

8. The computer implemented method of claim 7 wherein the context of an interaction comprises a procedure call sequence.

9. The computer implemented method of claim 7 wherein the data structure represents, for each interface, a tree structure for a set of call sequences leading to the interaction with the interface, each leaf of the tree corresponding to a different context.

10. The computer implemented method of claim 1 where invariants associated with an interface characterize constraints satisfied by parameters used in the interactions with said interface.

11. The computer implemented method of claim 10 wherein the constraints include at least a constraint chosen from the set of: equality of a parameter value with a constant; equality of two parameter values; and membership of a parameter value in a set of values.

12. The computer implemented method of claim 11 wherein the constraints include a constraint satisfied by a function of a parameter value.

13. The computer implemented method of claim 12 wherein the function of the parameter value includes at least one of an extension, directory, and directory path of a parameter value representing a pathname in a file structure.

14. The computer implemented method of claim 1 wherein the first software component comprises a program component and the second software component comprises an operating system component, and the set of interfaces comprise interfaces to services provided by the operating system.

15. The computer implemented method of claim 1 wherein the first software component comprises a program component and the second software component comprises a software library component, and the set of interfaces comprise interfaces to library routines provided by the library component.

16. The computer implemented method of claim 1 wherein the first software component and the second software component comprise software components of a distributed system, and the interactions between the components comprise messages passed between the components.

17. A computer implemented method for automatically patching errors in a software system that includes a first software component and a second software component including a set of interfaces, at least some of the interfaces each having a set of parameters, the method comprising:
    accepting a data structure including an association of each interface in the set of interfaces with invariants associated with that interface; and
    for each interaction of a plurality of interactions between the first software component and the set of interfaces of the second software component:
        using the data structure to determine whether the interaction between the first software component and an interface of the set of interfaces violates any invariants associated with the interface and their associated contexts; and
        initiating an error control procedure including performing a known behavior in response to the interaction if it is determined that the interaction violates any invariants associated with the interface and their associated contexts.

18. A computer implemented method for automatically patching errors in a plurality of software systems, each including a first software component and a second software component including a set of interfaces, at least some of the interfaces each having a set of parameters, the method comprising:
    monitoring a first set of executions of each of the software systems including:
        monitoring a plurality of error-free interactions between the first software component and the set of interfaces of the second software component;
        identifying invariants from the plurality of error-free interactions, each invariant being associated with one or more contexts;

forming a data structure including an association of each interface in the set of interfaces with invariants associated with that interface; and merging the data structures formed by each of the software systems into a central data structure monitoring a second set of executions of each of the plurality of software systems including:

accepting the central data structure;

for each interaction of a plurality of interactions between the first software component and the set of interfaces of the second software component:

using the data structure to determine whether the interaction between the first software component and an interface of the set of interfaces violates any invariants associated with the interface and their associated contexts; and initiating an error control procedure including performing a known behavior in response to the interaction if it is determined that the interaction violates any invariants associated with the interface and their associated contexts.

* * * * *